Patented Aug. 24, 1937

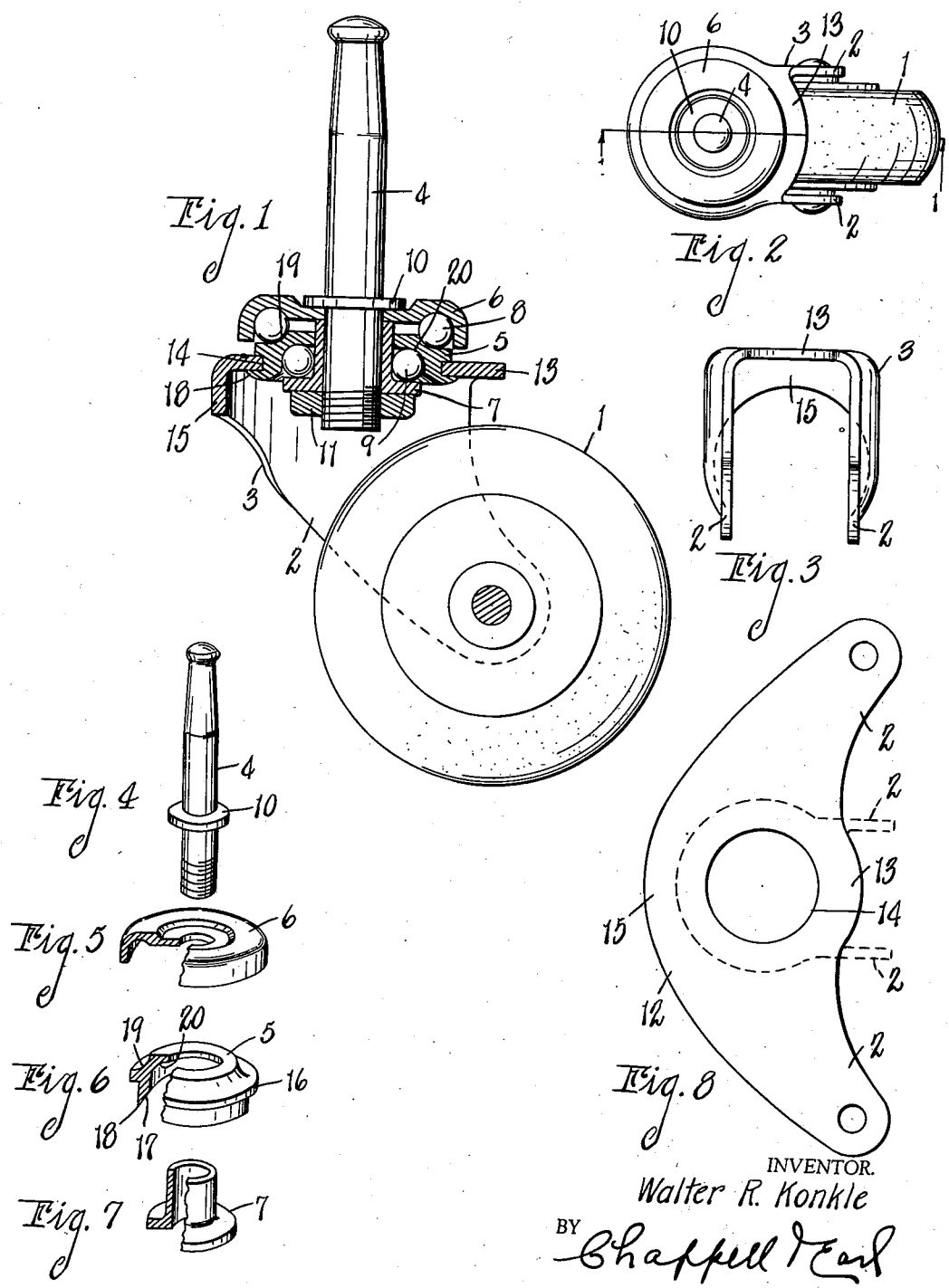

2,090,960

UNITED STATES PATENT OFFICE 2,090,960

CASTER

Walter R. Konkle, Albion, Mich., assignor to Decker Screw Products Company, Albion, Mich.

Application May 17, 1934, Serial No. 726,094

4 Claims. (Cl. 16—21)

The main objects of this invention are:

First, to provide an improved caster for furniture and the like, the caster being of the ball bearing type and having a central bearing member provided with upper and lower ball races in concentric relation to a common axis.

Second, to provide an improved method of making casters of this character.

Third, to provide a caster having the above desirable features and characteristics and which is simple and economical in its parts and very efficient and effective in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is a view in vertical section of a caster embodying the features of my invention, the section being taken on line 1—1 of Fig. 2.

Fig. 2 is a top plan view.

Fig. 3 is a view in front elevation of the yoke.

Fig. 4 is a perspective view of the spindle.

Fig. 5 is a perspective view of the upper bearing member, a portion being broken away and shown in section.

Fig. 6 is a perspective view of the central bearing member, a portion being broken away and shown in section.

Fig. 7 is a perspective view of the lower bearing member, a portion being broken away and shown in section.

Fig. 8 is a plan view of the yoke stamping, the dotted lines indicating the position of the arms after forming.

Referring to the drawing, in the illustrated embodiment of my invention, numeral 1 is a rubber-tired wheel mounted between the arms 2 of the yoke 3, the latter being swiveled to the spindle 4. The swivel comprises a central bearing member 5, an upper bearing member 6, a lower bearing member 7, and upper and lower bearing balls 8 and 9.

The upper bearing member 6 and lower bearing member 7 are secured in assembled relation with the lower end of the spindle 4 by means of the flange or abutment 10 and the nut 11.

The yoke 3 is a comparatively light sheet metal stamping, desirably aluminum, and the bearing member 5 consists of a casting which is machined in the manner and for the purpose set forth in more detail below.

As shown by Fig. 8, the yoke stamping 12 is formed so as to provide the arms 2 and a web 13 when folded, the web being provided with a central opening 14 and the arms being connected by the flange 15. Thus, the yoke is inexpensive both in material and in forming and at the same time is comparatively rigid.

The central bearing member 5 is formed of suitable bearing metal such as cast steel and is provided with an upper flange 16 adapted to engage the top of the web 13 when the bearing member is fitted in the opening 14 as shown. The lower end of the bearing member 5 is beveled at 17, see Fig. 6, so that the lower edge 18 may be easily upset or spun over the bottom of the web 13 of the yoke to clamp the same as shown by Fig. 1. The central bearing member and web of the yoke are thus secured in fixed assembled relation or as an assembled unit.

Before assembling the central bearing member 5 with the yoke, I simultaneously machine the upper-outer ball race 19 and the lower-inner ball race 20 thereon. By machining these ball races at the same time and with the same set-up, the concentric relation of the ball races is assured inasmuch as they are in concentric relation to a common axis. This results in a very efficient swivel and one which is not subject to wear as in swivels where the bearing surfaces or races are out of concentric relation with each other.

By making the caster in the manner described above, the caster is not only light in weight and economical to produce, but it is very serviceable and efficient, binding in the ball bearing swivel being substantially eliminated.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. A caster comprising in combination, a sheet metal yoke having a web provided with an opening, and a one-piece central bearing member seated within said opening and having an upper outwardly facing ball race and a lower inwardly facing ball race, said upper and lower races being in concentric relation to the axis of said bearing member.

2. A caster comprising in combination a yoke having a web provided with an opening, and a one-piece central bearing member fitting in said opening and having an upper flange engaging the top of said web and a lower flange engaging the bottom of said web, said bearing member having upper-outer and lower-inner ball races in concentric relation to a common axis.

3. In a caster of the ball bearing type, the combination with a wheel swiveled to a bolt or pin, of a yoke having arms to which said wheel is journaled and a web provided with an opening, a one-piece central bearing member mounted on said web in said opening and having concentric inner and outer ball bearing races, upper and lower bearing members mounted on said pin or bolt and having ball bearing races for coaction with said inner and outer races, and ball bearings disposed between said coacting ball bearing races.

4. In a caster, the combination with a wheel yoke having a web opening, a spindle centrally disposed through said opening, upper and lower annular bearing members secured to said spindle, and anti-friction bearings associated with said bearing members, of an integral central annular bearing member disposed between said spindle and said yoke in said web opening and having an annular groove receiving the web at the edge of the opening and securing the web and central bearing member together, the central annular bearing member being formed to provide upper-outer and lower-inner annular bearing surfaces for coaction with said anti-friction bearings, said upper and lower bearing surfaces being in absolutely concentric relation to a common axis, binding between the anti-friction bearings caused by non-concentric bearing surfaces being thus prevented both in assembling the parts and in service.

WALTER R. KONKLE.